(12) United States Patent
Kobayashi et al.

(10) Patent No.: US 6,170,545 B1
(45) Date of Patent: Jan. 9, 2001

(54) SAFETY PNEUMATIC TIRE

(75) Inventors: Kazuomi Kobayashi; Tomohisa Nishikawa; Kenji Matsuo, all of Tokyo (JP)

(73) Assignee: Bridgestone Corporation, Tokyo (JP)

(*) Notice: Under 35 U.S.C. 154(b), the term of this patent shall be extended for 0 days.

(21) Appl. No.: 09/305,714

(22) Filed: May 5, 1999

(30) Foreign Application Priority Data

May 12, 1998 (JP) .................................................. 10-129178

(51) Int. Cl.$^7$ ............................. B60C 17/00; B60C 17/06
(52) U.S. Cl. ............................................. 152/157; 152/517
(58) Field of Search .................................. 152/310–312, 152/318, 313, 157, 158, 516, 517, 165, 319, 320–322

(56) References Cited

U.S. PATENT DOCUMENTS 3,195,601 * 7/1965 Travers .................................. 152/313

* cited by examiner

Primary Examiner—Adrienne C. Johnstone
(74) Attorney, Agent, or Firm—Sughrue, Mion, Zinn, Macpeak & Seas, PLLC

(57) ABSTRACT

There is disclosed a safety pneumatic tire comprising a tire shell which is equipped with a toroidal carcass extending over a pair of bead portions and also functioning as a reinforcing material for a side wall portion connected to the bead portions and further for a tread portion, and which has a side-reinforcing layer on the internal surface of the sidewall portion; a rim which hermetically seals and supports the bead portions of the tire shell; and closed cell-based elastic foam which is filled in the internal hollow portion encompassed by the tire shell and the rim, wherein the constructional material of the elastic foam is butyl rubber or halogenated butyl rubber. The above safety pneumatic tire is markedly improved in run-flat durability, can reconcile favorable riding comfort chacteristic with the run-flat durability, is minimized in adverse influence upon the tire performances such as rolling resistance, and enables the production of a lightweight pneumatic tire.

8 Claims, 3 Drawing Sheets

SAFETY PNEUMATIC TIRE

BACKGROUND OF THE INVENTION

1. Field of the Invention

The present invention relates to a safety pneumatic tire, in particular, a safety pneumatic tire (tire assembly) which is greatly improved in both run-flat durability and riding comfort characteristic. More particularly, the present invention is concerned with a safety pneumatic tire which is equipped with a side-reinforcing layer and is filled with specific elastic foam in the internal hollow portion encompassed by a tire shell and a rim.

2. Description of the Related Arts

A number of proposals for a safety pneumatic tire have heretofore been made in order to enable the tire to continue running for the time being even in the case where the tire is deprived of pneumatic pressure by reason of puncture, flattening or the like. For instance, there is known a pneumatic tire which comprises a tire shell and closed cell-based foam which is filled into the internal hollow portion of the assembly composed of the tire shell and a rim which fits the above-mentioned tire to itself (refer to Japanese Patent Application Laid-Open Nos. 127207/1994(Hei-6), 183226/1994(Hei-6), 186610/1995(Hei-7), 332805/1996(Hei-8) and the like.

However, any of the tires disclosed therein is limited mainly to a special tire or a small-sized tire such as a tire for agricultural or tillage use, a rally tire, a tire for a two-wheeled vehicle, a bicycle tire and the like. In addition, there have heretofore been proposed a variety of safety pneumatic tires such as a tire of double-wall structure, a tire equipped inside with a load-supporting apparatus, and a side-reinforced tire. Of these, an example of the most general tire in practical service at the present time, is so-called a side-reinforced tire which is equipped with a side-reinforcing layer composed of relatively hard rubber lying inside of the side wall portion and extending over both the shoulder portion and the bead portion. Such kind of tire is used principally for a run-flat tire having an aspect ratio of at most 60%. Moreover, in the case of a pneumatic tire having a relatively large height and an aspect ratio of at least 60%, there is known a run-flat tire with such a structure that supports the load at the time of puncture or flattening by mainly fixing a tire-supporting member into a rim in order to avoid the heat build-up in the side wall portion due to relatively long-distance running with a high speed.

On the other hand, the requirements For the performance of a run-flat tire tend to be more and more enhanced, and thus it is the actual situation that further improvement in a possible run-flat distance of the tire is eagerly desired. In particular, in the case of a safety pneumatic tire with an aspect ratio of at least 60%, the tire is desired to exhibit satisfactory riding comfort characteristic under normal condition as well as sufficient run-flat durability. However, the problems in conventional side-reinforced tires still remain unsolved in that the run-flat durability is improved to some extent, but is not yet sufficiently improved, the riding comfort characteristic and the rolling resistance are markedly worsened, and in addition the tire weight is unfavorably increased.

SUMMARY OF THE INVENTION

Under such circumstances, a general object of the present invention is to provide a safety pneumatic tire which is remarkably improved in run-flat durability, is excellent in both run-flat durability and riding comfort characteristic, has a relatively light weight, and further is excellent in rolling resistance.

Other objects of the present invention will be obvious from the text of this specification hereinafter disclosed.

In view of the foregoing, intensive research and investigation were made by the present inventors in order to solve the above-mentioned problems. As a result, it has been found that the run-flat durability of a pneumatic tire is drastically enhanced by arranging a side-reinforcing rubber layer in the internal surface of a side wall portion and at the same time, filling closed cell-based foam comprising butyl rubber or halogenated butyl rubber in the internal hollow portion encompassed by a tire shell and the tire rim. The present invention has been accomplished by the above-mentioned findings and information.

It has been recognized in the course of the aforestated research and investigation by the present inventors that in the case of the conventional side-reinforced tire and the tire filled in with foam, the run-flat durability of a tire, that is, the possible run-flat distance of a tire after the puncture or flattening thereof, is closely related to the amount of the deflection of the tire. The above-mentioned findings can be seen, for instance, from the results of Comparative Examples 1 to 6 (refer to Table 1) in which testing was carried out by the present inventors through the use of the conventional side-reinforced tires. The findings can also be seen from the results of Reference Examples 1 to 4 (refer to Table 3 and FIG. 4) in which testing was carried out by the use of the conventional tires that were filled in with butyl rubber foam, but were not equipped with a side wall-reinforcing layer. The actual load ranges of the tires in Reference Examples 1 to 4 correspond to the tire deflection rate in the range of about 35 to 40%.

It has also been recognized in the course thereof by the present inventors that, in the case of butyl rubber or halogenated butyl rubber being employed in particular as the constructional material for the above-mentioned closed cell-based foam, an increase in the tire deflection rate due to flat-run is suppressed at a given level. Thereafter the tire deflection rate is decreased to some extent as the case may be, rather than is increased, whereby the tire deflection rate reaches a steady state (refer to Table 4 of Reference Example 5). The reason for the foregoing is thought as follows: Butyl rubber or halogenated butyl rubber is such rubber that has not only excellent gas-impermeability but also relatively high heat-build-up property, and therefore the pressure inside the closed-cell foam is raised by the self-heat generation, thereby suppressing the tire deflection. On the one hand, the decreased tire deflection decreases the self-heat generation of the foam of the tire. As a result, the temperature rise of the tire is ceased, so that the tire is brought to a steady state (the load-supporting mechanism of the foam). The above-mentioned phenomenon is a peculiar phenomenon which can not usually be seen in any of the conventional tires such as a side wall-reinforced tire and a tire inside of which is merely filled with elastic foam.

The present invention, which has been developed on the basis of the foregoing findings and information for the purpose of exhibiting the working effect in the actual load range, provides a safety pneumatic tire comprising a tire shell which is equipped with a toroidal carcass extending over a pair of bead portions and also functioning as a reinforcing material for a side wall portion connected to said bead portions and further for a tread portion, and which has a side-reinforcing layer on the internal surface of said side wall portion; a rim which hermetically seals and supports said bead portions of said tire shell; and closed-cell-based elastic foam which is filled in the internal hollow portion encompassed by said tire shell and said rim, wherein the constructional material of said elastic foam is butyl rubber or halogenated butyl rubber. The present invention also provides the safety pneumatic tire according to the aforestated constitution, wherein said tire has an aspect ratio of at least 60%, and at the same time, provides a tubeless pneumatic tire according to the aforestated constitution.

BRIEF DESCRIPTION OF THIEF DRAWINGS

Figure 1:
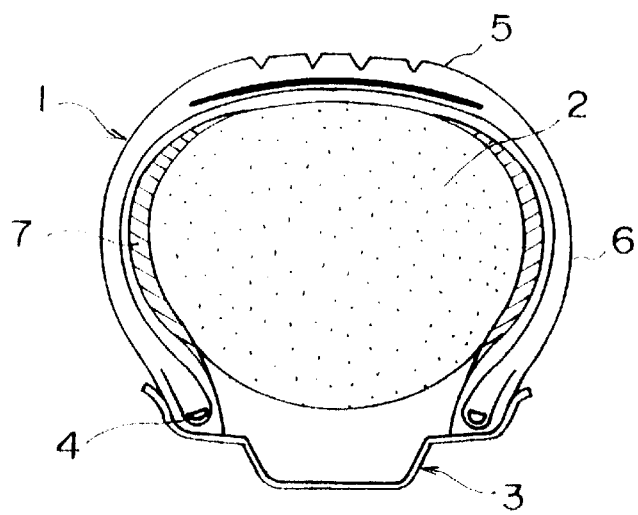
FIG. 1 is a cross-sectional view showing a safety pneumatic tire exemplified in the present invention.

Designations of the symbols are as follows:

1: tire shell
2: elastic loam
3: rim
4: bead portion
5: tread portion
6: side-wall portion
7: side-reinforcing layer

DESCRIPTION OF THE PREFERRED EMBODIMENTS

It is necessary in the safety pneumatic tire according to the present invention that the material of the closed cell-based elastic foam filled in the internal hollow portion encompassed by the tire shell and the rim be butyl rubber or halogenated butyl rubber.

The above-mentioned butyl rubber or halogenated butyl rubber is not specifically limited, but may include a modified product derived therefrom. Preferable examples of the halogenated butyl rubber include chlorobutyl rubber and bromobutyl rubber. A specific example of the chlorobutyl rubber is the product manufactured by Enjay Chemical Corporation under the trade name "Enjay Butyl HT10-66". A specific example of the bromobutyl rubber is the product manufactured by Exxon Corporation under the trade name "Bromo-Butyl 2255". In addition, there is usable the chlorinated or brominated copolymer derived from the copolymer of an isomonoolefin and p-methylstyrene. A specific example of the chlorinated or brominated copolymer is, for instance, the product manufactured by Exxon Corporation under the trade name "Exxpro".

It is preferable in the present invention that the closed cell-based elastic foam which is filled in the internal hollow portion encompassed by the toroidal tire shell and the rim to be used, have an expansion ratio of 600 to 1500%. The above-mentioned expansion ratio (V) is represented by the following formula:

V={(volume of elastic foam)/(internal volume of mold)}×100%

Examples of blowing agents to be used for preparing the closed cell-based elastic foam include azodicarbonamide; dinitroso-pentamethylenetetramine; azobisisobutyronitrile; benzenesulfonylhydrazide; 4,4'-oxybisbenzenesulfonylhydrazide; and the like. Of these, azodicarbonamide is preferable from the evironmental viewpoint. In addition, there is usable urea and the like as an assistant blowing agent.

The above-mentioned closed cell-based elastic foam can be produced by a conventional process, for instance, by a method in which butyl rubber or halogenated butyl rubber is blended with any of the above-exemplified blowing agents along with blending ingredients that are ordinarily used therein, the resultant mixture is kneaded and extruded into a prescribed form, and the extruded article is subjected to foaming molding under pressurized steam in a steam vulcanizing kettle.

The amount of the elastic foam to be filled is preferably 60 to 100%, particularly preferably 70 to 90% on the basis of the volume of the internal hollow portion under atmospheric pressure.

In the following, the safety pneumatic tire according to the present invention will be described in detail with reference to the drawings. The safety pneumatic tire shown in FIG. 1, which is an example according to the present invention, comprises the tire shell 1; the rim 3; and the closed cell-based elastic foam 2 which is filled in the internal hollow portion encompassed by said tire shell 1 and said rim 3. The rubber layer as the side-reinforcing layer 7 is placed inside the side wall portion 6 of the tire. The hardness of the rubber composition for the rubber-reinforcing layer 7 is not particularly limited, but can be selected in the range of 65 to 90 degrees in terms of JIS A hardness (JIS is Japanese Industrial Standard).

The side-reinforced safety pneumatic tire according to the present invention is effectively applied to a tire having a relatively large cross-sectional height-and an aspect ratio of at least 60%. In this case, there is obtainable an objective safety pneumatic tire which, in particular, is excellent in both the run-flat durability and riding comfort characteristic, is favorable in rolling resistance, and further is lightweight. The aspect ratio as mentioned herein is expressed by {(the cross-sectional height of the tire)/(the width of the tire)}× 100 (%). Moreover, the thickness of the side-reinforcing layer 7 is properly set according to the tire size. Said thickness is preferably 5 to 15 mm in the case of a safety pneumatic tire for a passenger car which has an aspect ratio of 60%.

The tire shell 1 which constitutes the safety pneumatic tire according to the present invention, that is, the tire reinforced with a reinforcing layer without the use of the elastic foam (mousse), has a deflection rate of preferably at most 60%, particularly in the range of 40 to 60% when measured under a tire internal pressure (hereinafter referred to as "inside pressure") of atmospheric pressure at 75% load of the maximum possible load according to the standard of JATMA (Japanese Automobile Tire Manufactures Association).

The physical properties of the elastic foam to be filled in the hollow portion inside the tire should be set so that the deflection rate of the tire, under atmospheric inside pressure and under 75% load of the maximum possible load according to the standard of JATMA, is preferably at most 70%, more preferably 40 to 70%, by the use of an ordinary tire which has the same constitution and the same size as those of the tire according to the present invention, except that the side-reinforcing layer is out of use and which is equipped with the above-described elastic foam in the internal hollow portion encompassed by the tire shell and the rim.

That is to say, by setting the deflection rate of each of the tires to the above-stated definite range, the deflection rate of the tire according to the present invention becomes 30% or less. As a result, the run-flat durability of said tire can effectively be improved.

As described hereinbefore, the above-mentioned safety pneumatic tire according to the present invention can be markedly improved in its run-flat durability and can reconcile favorable riding comfort characteristic with the run-flat durability. In addition, since the thickness of the side-reinforcing layer of said tire can be decreased in comparison with the conventional side-reinforced run-flat tire, it is enabled to minimize adverse influence upon the other tire performances such as rolling resistance and to realize the production of a lightweight pneumatic tire.

In the following, the present invention will be described in more detail with reference to comparative examples and working examples, which however shall not limit the present invention thereto.

Various measurements were made according to the methods as described hereunder.

(1) Deflection rate of tire

Figure 5:
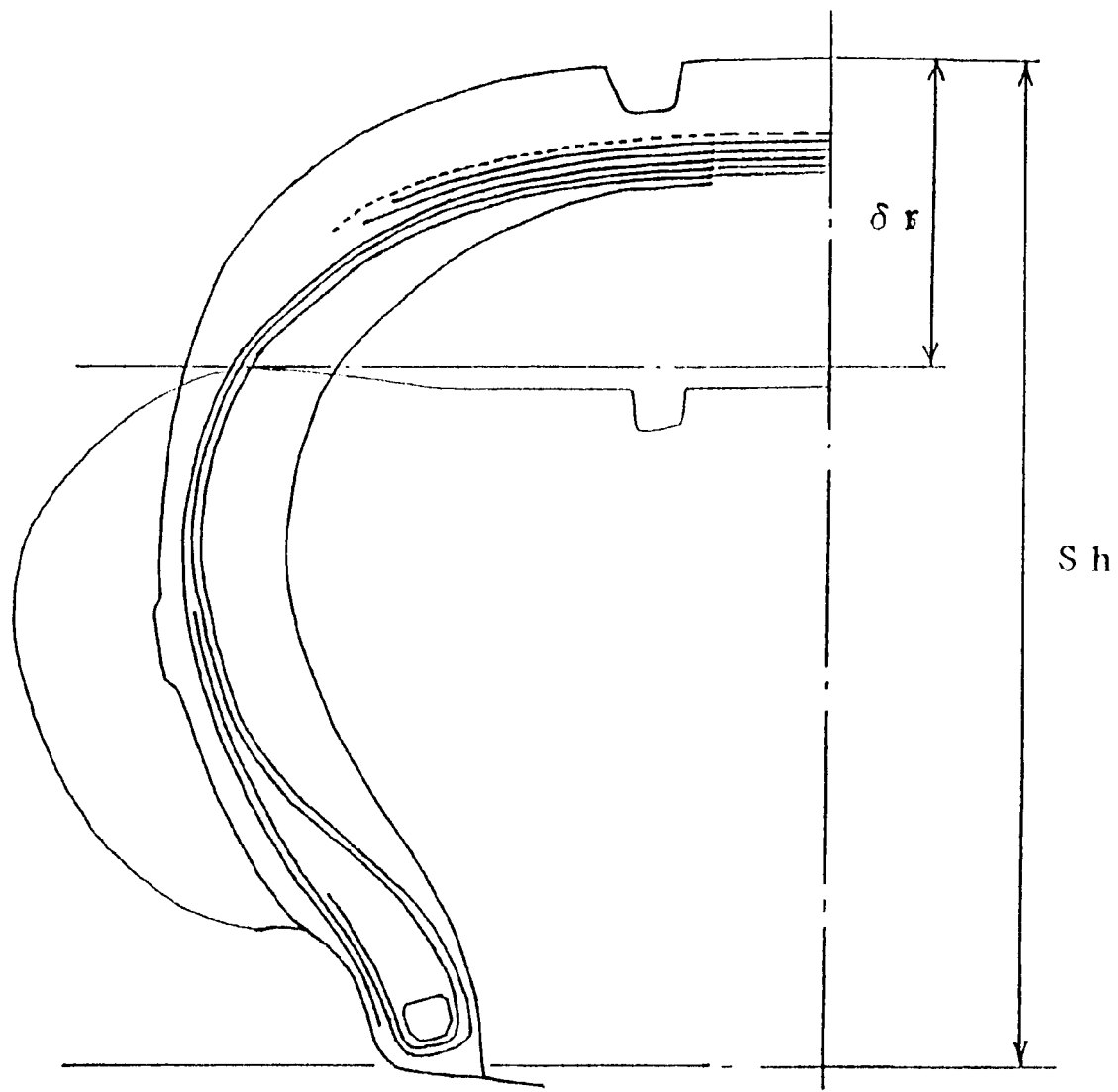
FIG. 5 is a diagram describing the deflection rate of the tire according to the present invention.

The deflection rate of a tire has been obtained from the formula ($\delta$ r/Sh)×100% wherein $\delta$ r is the amount of deflection when a definite load is applied to the tire under atmospheric pressure as the inside pressure (without a tube valve) {refer to FIG. 5}, and Sh is {(outside diameter of the tire)–(rim diameter)}/2 {refer to FIG. 5}.

(2) Riding comfort characteristic

Each of the test tires was mounted to a passenger car, feeling tests for riding comfort characteristic were carried out by two professional test drivers, and any of ten evaluation marks ranging from mark 1 to mark 10 was applied to the riding comfort characteristic. The marks were averaged to obtain the final evaluation mark. In the following comparative examples and working examples, an ordinary pneumatic tire without side-reinforcing layer and elastic foam was used as the reference, and the riding comfort characteristic for the pneumatic tire equipped with the side-reinforcing layer and elastic foam was marked as "10".

(3) Run-flat durability

A test tire whose inside pressure was atmospheric pressure (without a tube valve) was mounted to the right-hand front wheel of a commercial. car, running test was carried out at a velocity of 90 Km per hour on an oval test course mainly having straight-line. At the point of time when the vibrasion at the driver seat during the running became considerably large (twice the vibrasion in the initial stage of running), a judgement was made to the effect that the tire was damaged. Thus the distance until the time of the damage was regarded as the possible running distance of the tire. In the following comparative examples and working examples, a conventional side-reinforced run-flat tire which had a deflection rate of 36% as measured according to the foregoing item (1) {Comparative Example 3} was used as the reference, and the possible run-flat distance of the tire was expressed as an index of 100.

Comparative Examples 1 to 6

Six kinds of test tires were prepared so that the resultant tires had each a gauge (thickness) of a reinforcing layer different from one another as shown in Table 1 by the use of a conventional side-reinforced pneumatic tire sized 225/60R16 and equipped with a side-reinforcing Layer inside a side wall. Thus evaluations were made for the test tires, of the deflection ratio, riding comfort characteristic and run-flat durability under load conditions, when running, of 75% load of the maximum possible load according to the standard of JATMA. The results are given in Table 1.

TABLE 1

| | | Item | | |
|---|---|---|---|---|
| Comparative Example | Gauge (mm) of tire side-reinforcing rubber layer | Deflection rate of tire (%) * 1 | Run-flat durability (index) * 2 | Riding comfort characteristic (evaluation mark) * 3 |
| 1 | 14.0 | 26 | 300 | 3.0 |
| 2 | 12.2 | 32 | 155 | 5.0 |
| 3 | 10.2 | 36 | 100 | 7.0 |
| 4 | 7.3 | 42 | 43 | 8.0 |
| 5 | 5.5 | 55 | 15 | 9.5 |
| 6 | 5.0 | 60 | 5 | 9.5 |

{Remarks}
* 1: Measured under the conditions of 75% load of the maximum possible load according to the standard of JATMA.
* 2: The run-flat durability of the tire in Comparative Example 3 was set to 100.
* 3: The riding comfort characteristic of an ordinary tire without side reinforcement nor elastic foam was set to 10.

Example 1 to 2

Test tires were prepared according to the present invention by using each of the pneumatic tires based on the above-described Comparative Examples 1 to 6 as a tire shell, and filling in the internal hollow portion encompassed by the tire shell and a rim, with elastic foam which had an expansion ratio of 700% and a chemical composition as described hereunder in an amount of 80% based on the volume of said hollow portion. Then evaluations were made of the deflection ratio, riding comfort characteristic and run-flat durability for each of the tires thus prepared. The load condition at the time of running a commercial car was 75% load of the maximum possible load according to the standard of JATMA. The results are given in Table 2.

| ( Chemical composition of the elastic foam ) | |
|---|---|
| Butyl rubber | 100 parts by weight |
| Carbon black | 40 parts by weight |
| Process oil | 25 parts by weight |
| Stearic acid | 2 parts by weight |
| Zinc oxide | 5 parts by weight |
| Sulfur | 1 parts by weight |
| Urea | 5 parts by weight |
| Vulcanization accelerator | 2 parts by weight |
| Azodicarbonamide | 10 parts by weight |

The physical properties of the butyl rubber foam which was used in the present Examples 1 to 6 were such that when the butyl rubber foam was filled in the internal hollow portion of an ordinary tire which was sized 225/60R16 and was devoid of side reinforcement, and when the deflection rate of the tire was measured under the conditions of 75% load of the maximum possible load according to the standard of JATMA under the inside pressure of atmospheric pressure, then the deflection rate thereof was 60%.

TABLE 2

| Example | Gauge (mm) of tire side-reinforcing rubber layer | Deflection rate of tire (%) * 1 | Run-flat durability (index) * 2 | Riding comfort characteristic (evaluation mark) * 3 |
|---|---|---|---|---|
| 1 | 14.0 | 20 | ≧1000 | 3.5 |
| 2 | 12.2 | 21 | ≧1000 | 4.5 |
| 3 | 10.2 | 23 | ≧1000 | 6.5 |
| 4 | 7.3 | 25 | 950 | 8.0 |
| 5 | 5.5 | 28 | 330 | 9.5 |
| 6 | 5.0 | 30 | 105 | 10 |

{Remarks}
* 1: Measured under the conditions of 75% load of the maximum possible load according to the standard of JATMA.
* 2: The run-flat durability of the tire in Comparative Example 3 was set to 100.
* 3: The riding comfort characteristic of an ordinary tire without side reinforcement nor elastic foam was set to 10.

It is understood from the above-described results that the run-flat durability has been remarkably improved in the working examples according to the present invention. Specifically, when the results of Example 4 are compared with the results of Comparative Example 4 each having a side-reinforcing layer of the same gauge (thickness) of 7.3 mm, although both the results show the same riding comfort characteristic of 8.0, Example 4 demonstrates a run-flat durability of 950 (in terms of index), which is much higher than and 22 times that of Comparative Example 4 indicating only 43. Likewise, marked improvement in the run-flat durability is obvious in all of the other Examples 1, 2, 3, 5 and 6 which have a side-reinforcing layer of the gauges of 14.0 mm, 12.2 mm, 10.2 mmm, 5.5 mm and 5.0 mm, respectively, as compared with respective corresponding Comparative Examples 1, 2, 3, 5 and 6.

Figure 2:
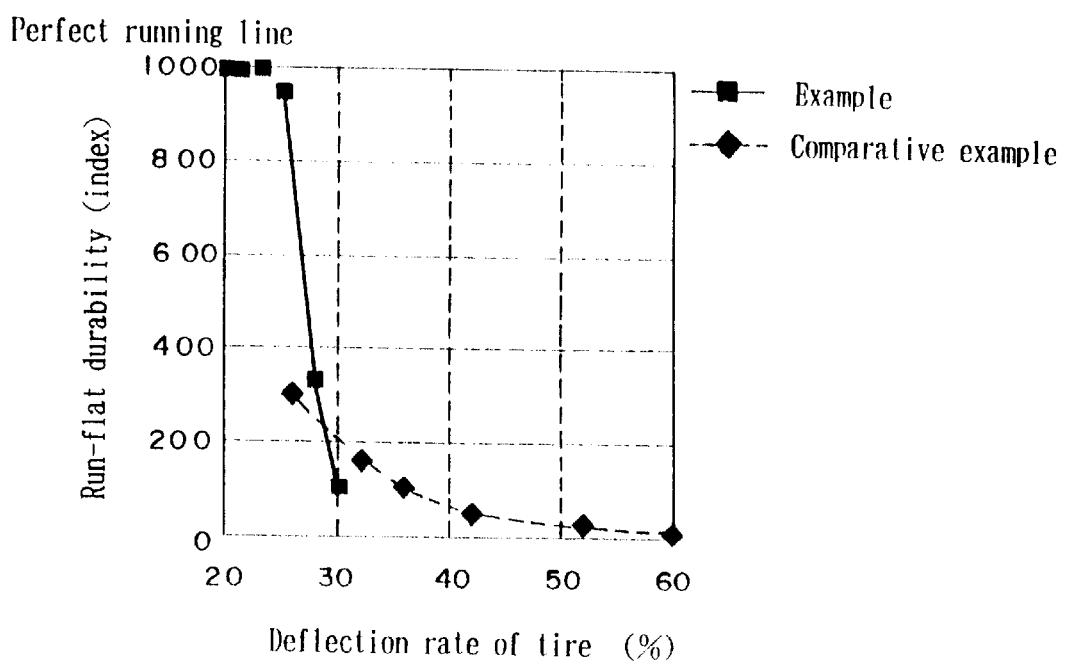
FIG. 2 is a graphic representation showing the relationship between the deflection rate and run-flat durability with regard to both the tire according to the present invention and the conventional side-reinforced tire.

In addition, FIG. 2 points out the relationship between the run-flat durability and the deflection rate in the form of curves obtained by plotting the run-flat durability against the deflection rate on the basis of foregoing results of the examples and comparative examples. In said FIG. 2, the deflection rates in Examples 1 to 6 in the form of a solid curve obtained by jointing the marks "■" is controlled by the enclosed elastic foam; whereas the deflection rates in Comparative Examples 1 to 6 in the form of a dotted curve obtained by jointing the marks "♦" is controlled by varying the maximum thickness of the rubber-reinforcing layer which is arranged on the side wall portion. It can be seen from FIG. 2 that only in the examples, the run-flat durability is drastically enhanced in the region of the deflection rate being 30% or less. The reason for this fact is due to the load-supporting mechanism of the aforesaid elastic foam. In each of the tires of the examples, the run-flat durability greatly enhances with a decrease in the deflection rate. On the other hand, in the tires of the comparative examples, the run-flat durability does not greatly enhance even when the deflection rate thereof is decreased to 30% or less. Moreover, when the results of Example 6 are compared with those of Comparative Example 2 each showing similar value of the deflection rate, it can be seen that in spite of no remarkable difference in the run-flat durability between the two, there is great difference in the riding comfort characteristic therebetween.

Figure 3:
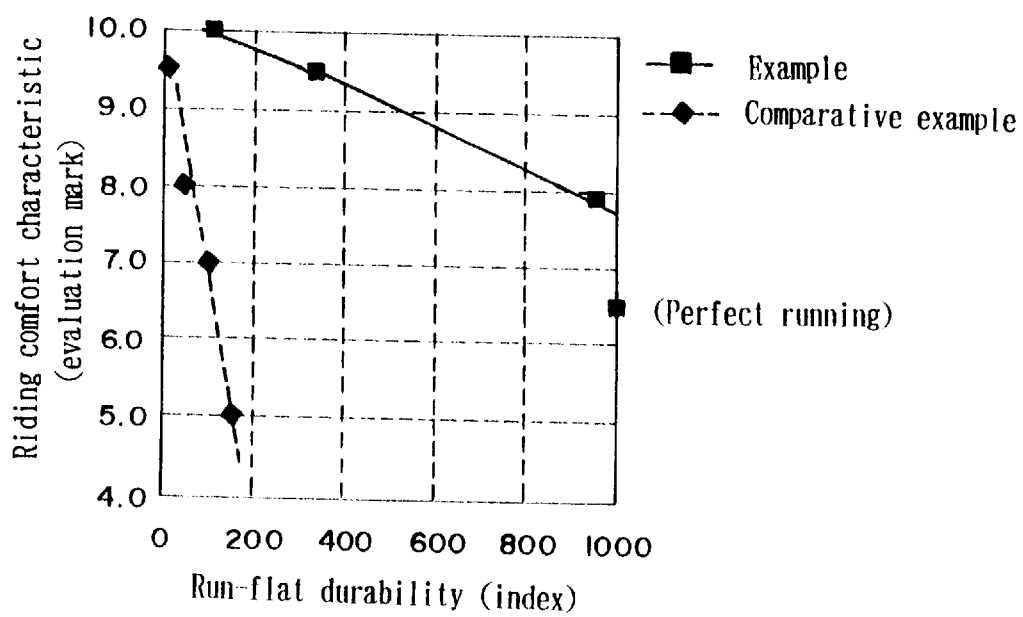
FIG. 3 is a graphic representation showing the relationship between the run-flat durability and riding comfort characteristic with regard to both the tire according to the present invention and the conventional side-reinforced tire.

In addition, FIG.3 points out the relationship between the riding comfort characteristic and the run-flat durability in the form of lines obtained by plotting the riding comfort characteristic against the run-flat durability on the basis of the foregoing results. The relationship is expressed for Examples 3 to 6 in the form of a solid line obtained by jointing the marks "■", and for Comparative Examples 2 to 6 in the form of a dotted line obtained by jointing the marks "♦". It can be seen from FIG. 3 that the examples according to the present invention are markedly enhanced in riding comfort characteristic over the comparative examples by comparing the tires of the examples with those of the corresponding comparative examples each showing the same run-flat durability, that is, the same possible run-flat distance (index)

Figure 4:
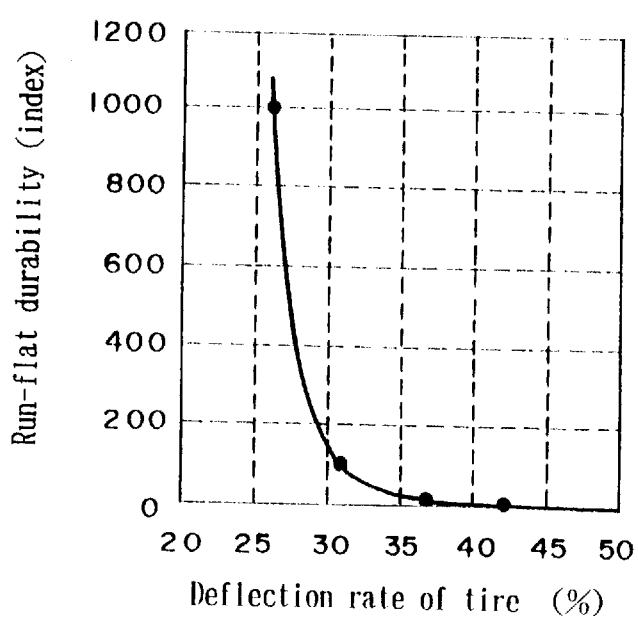
FIG. 4 is a graphic representation showing the relationship between the deflection rate and run-flat durability with regard to the tires in Reference Examples 1 to 4.

Reference Examples 1 to 4 the same manner as in Example 1, test rires which were filled in the internal hollow portion thereof with butyl rubber foam in an amount of 80% based on the hollow portion except that use was made of an ordinary tire with elastic foam but without a side-reinforcing layer for the tire shell, were prepared. Then evaluations were made of the deflection rate, riding comfort characteristic and run-flat durability of the tires thus prepared under four different loads of 43% , 60% 76% , and 100% each of the maximum possible load according to JATMA standard. The results are given in Table 3. In addition, FIG. 4 illustrates the relationship between the deflection rate and run-flat durability for each of the tires of Reference Example 1 to 4.

TABLE 3

| Ref. Examples | Load conditions (%) | Deflection rate of tire (%) | Run-flat durability (index) * 1 | Riding comfort characteristic (evaluation) * 2 |
|---|---|---|---|---|
| 1 | 43 | 26 | 1000 | 9 |
| 2 | 60 | 31 | 100 | 9 |
| 3 | 76 | 37 | 5 | 9 |
| 4 | 100 | 42 | 1 | 9 |

{ Remarks }
* 1: the run-flat durability in Comparative Example 3 was set to 3.
* 2: the riding comfort characteristic of an ordinary tire without side reinforcement nor elastic foam was set to 10.

Reference Example 5

In the same manner as in Reference Example 1, a test tire which was not equipped with a side-reinforcing layer, but which was filled with foamed rubber in the internal hollow portion of the tire shell, was prepared. Subsequently, a run-flat test was carried out by the use of the tire thus prepared and fitted to a commercial car, for a distance of 500 km under the conditions of a 43% load of the maximum possible load according to JATMA standard. Thus measurements were made of the change with the lapse of time in both the deflection rate of the tire and the temperature of the filled rubber foam. Moreover, another test was carried out in the same manner as described above except that the load condition was changed to 75% load of the maximum possible load according to JATMA standard. In this case, however, the temperature of the filled rubber foam was unreasonably raised thereby, and thus the test was brought to an end at a run-flat distance of only 8 km. The results are given in Table 4.

TABLE 4

| Load condition | 43% load of maximum possible load according to JATMA standared | | 75% load of maximum possible load according to JATMA standared | |
| --- | --- | --- | --- | --- |
| Running distance (km) | Deflection rate of tire (%) | Temperature of rubber foam (° C.) | Deflection rate of tire (%) | Temperature of rubber foam (° C.) |
| 0 | 26 | 37 | 37 | 37 |
| 8 | 20 | 75 | 50 | 195 |
| 24 | 16 | 110 | — | — |
| 53 | 12 | 135 | — | — |
| 98 | 9 | 141 | — | — |
| 180 | 8 | 140 | — | — |
| 300 | 8 | 141 | — | — |
| 400 | 9 | 140 | — | — |
| 500 | 9 | 140 | — | — |

What is claimed is:

1. A safety pneumatic tire comprising a tire shell which is equipped with a toroidal carcass extending over a pair of bead portions and also functioning as a reinforcing material for a side wall portion connected to said bead portions and further for a tread portion, and which has a side-reinforcing layer on the internal surface of said side wall portion; a rim which hermetically seals and supports said bead portions of said tire shell; and closed cell-based elastic foam which is filled in the internaL hollow portion encompassed by said tire shell and said rim, wherein the constructional material of said elastic foam is butyl rubber or halogenated butyl rubber.

2. The safety pneumatic tire according to claim 1, wherein an expansion ratio of said elastic foam is in the range of 600 to 1500%.

3. The safety pneumatic tire according to claim 1, wherein an aspect ratio of said tire is at least 60%.

4. The safety pneumatic tire according to claim 1, wherein the deflection rate of said tire shell is at most 60%, when measured under the tire internal pressure of atmospheric pressure at 75% of the maximum standard load.

5. The safety pneumatic tire according to claim 4, wherein the deflection rate of said tire shell is in the range of 40 to 60%.

6. The safety pneumatic tire according to claim 1, wherein the amount of the elastic foam to be filled in the internal hollow portion of said tire is in the range of 60 to 100% on the basis of the volume of the internal hollow portion under atmospheric pressure.

7. The safety pneumatic tire according to claim 1, wherein the thickness of the side-reinforcing layer is in the range of 5 to 15 mm.

8. The safety pneumatic tire according to claim 1, wherein the side-reinforcing layer is composed of a rubber composition having a JIS A hardness in the range of 65 to 95 degrees.

* * * * *